May 19, 1959  HANS-JOACHIM M. FÖRSTER  2,886,981
TRANSMISSION
Filed June 17, 1953  3 Sheets-Sheet 1

Inventor
HANS-JOACHIM M. FÖRSTER.
Dicke, Padlon and Craig
ATTORNEYS.

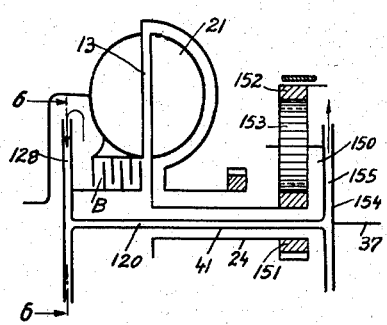
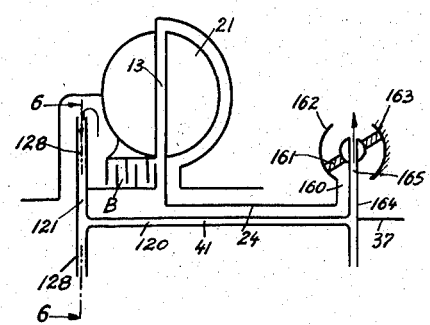
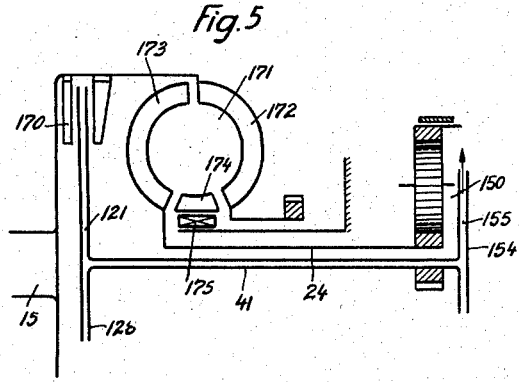
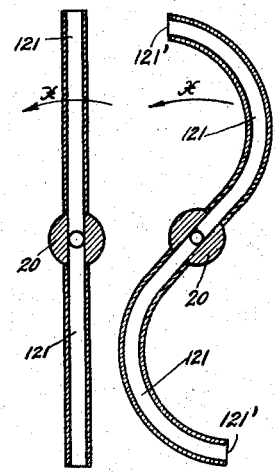

May 19, 1959  HANS-JOACHIM M. FÖRSTER  2,886,981
TRANSMISSION
Filed June 17, 1953  3 Sheets-Sheet 3
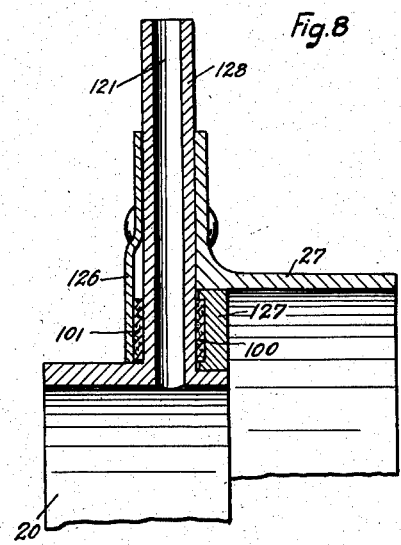
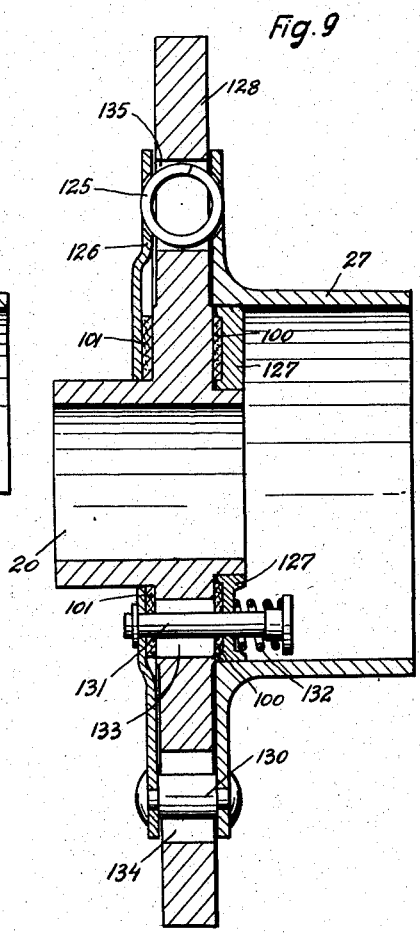
Inventor
HANS-JOACHIM M. FÖRSTER.
ATTORNEYS.

United States Patent Office 2,886,981
Patented May 19, 1959

2,886,981

TRANSMISSION

Hans-Joachim M. Förster, Stuttgart-Bad Cannstatt, Germany, assignor to Daimler-Benz Aktiengesellschaft, Stuttgart-Unterturkheim, Germany Application June 17, 1953, Serial No. 362,358

Claims priority, application Germany June 20, 1952

24 Claims. (Cl. 74—730)

My invention relates to a transmission and, more particularly to means for controlling the liquid level in hydrodynamic devices, such as hydrodynamic clutches or torque convertors, forming part of such a transmission. My invention is primarily applicable to automobile transmissions although it is not limited to such use.

More especially, my invention relates to a transmission in which a friction clutch is surrounded by the annular working chamber of a hydrodynamic device within a space communicating with such working chamber and adapted to be flooded by the liquid which fills the annular working chamber of the hydrodynamic device.

The objects of the present invention are to reduce the idling losses of the hydrodynamic device to a minimum; to provide a simple transmission of the character indicated in which the friction clutch cooperating with the hydrodynamic device can be operated in flooded condition to secure the best possible lubrication and dissipation of heat; to provide a transmission of the type indicated in which the space accommodating the friction clutch is kept free from the liquid when the transmission is set for a low speed of the driven shaft with the friction clutch disengaged, whereas when the transmission is set for a high speed of the driven shaft with the friction clutch in engaged condition, the latter is flooded with oil; and to provide an automobile transmission including a hydrodynamic clutch and a friction clutch of compact design which is reliable in operation and has a high degree of efficiency.

Further objects of my invention will appear from the description following hereinafter of a number of preferred embodiments of my invention and the features of novelty will be pointed out in the claims. I wish it to be clearly understood, however, that such detailed description serves the purpose of illustration of the invention rather than that of limitation. In the drawings, Fig. 1 is a partial axial section through the front portion of an automobile transmission, such portion including a hydrodynamic device, a friction clutch of the multi-disk type, an actuator therefor, and a rotary scooping member;

Fig. 3 illustrates a diagrammatic partial axial section through a transmission constituting another embodiment of my invention;

Fig. 4 is a view similar to that of Fig. 3 of a still further modification of my invention;

Fig. 5 is an illustration similar to that of Fig. 3 of still another embodiment of my invention;

Fig. 6 is a more or less diagrammatic section taken along the line 6—6 of Fig. 3 or 6—6 of Fig. 4;

Fig. 7 is a view similar to that of Fig. 6 of a modification of the element shown therein;

Fig. 8 is a detail of Fig. 1 on an enlarged scale; and

Fig. 9 represents the element shown in Fig. 8 in another diagrammatical section.

Figure 1:
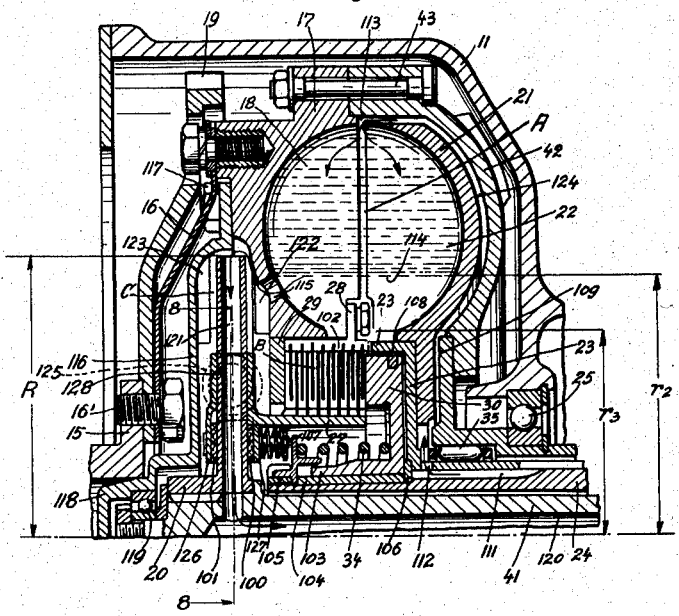
Figure 2:
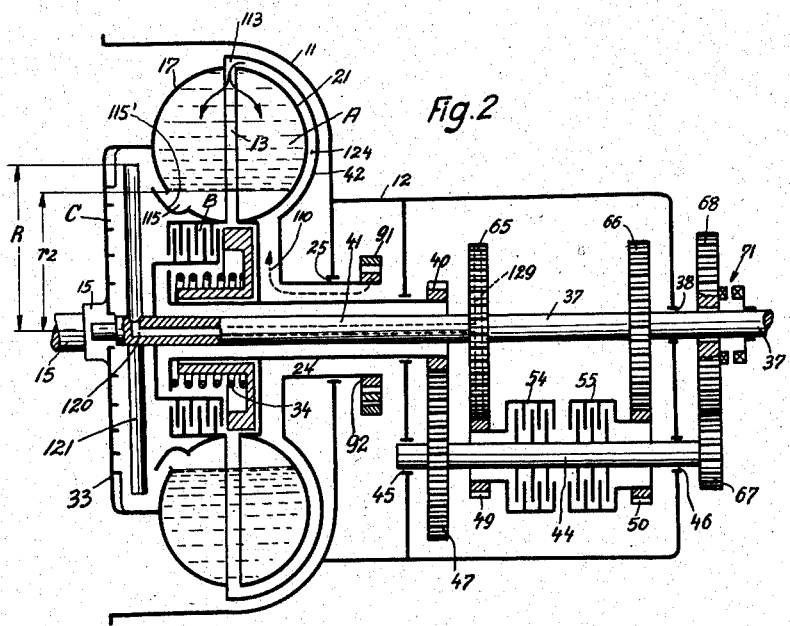
Fig. 2 is a diagrammatic axial section of the transmission shown in Fig. 1, said section being taken through the entire transmission including the sets of gears and the associated friction clutches.

In Figs. 1 and 2 I have shown my invention incorporated in an automobile transmission of the type shown and described in my copending application Serial No. 245,131, filed on September 5, 1951, with reference to Fig. 1 thereof, now Patent No. 2,756,616 dated July 31, 1956. Since reference may be had to such application for a detailed disclosure, it is believed to be sufficient to limit the detailed description hereinafter to the front portion of the transmission including the hydrodynamic device and the associated friction clutch, whereas the rear portion of the transmission including the sets of gears and the associated clutches will be but briefly described with reference to the diagrammatic showing in Fig. 2, such rear portion being identical with that disclosed in said prior case. In order to facilitate a reference to the prior application I have used the same reference numerals as in the latter to denote similar elements.

The crankshaft of the internal combustion engine has a rear flange 15. A disk 16 is connected with the flange 15 by threaded bolts 16' and carries the driving member 17 of a hydrodynamic clutch of customary design. The member 17 cooperates with the driven member 21 of the hydrodynamic clutch to form a substantially annular working chamber A. For that purpose, the member 17 has the shape of a hollow semi-annulus provided with internal vanes 18. The driven member 21 has the shape of a supplemental semi-annulus having internal vanes 22. In the present embodiment, the disk 16 is formed by a more or less flexible sheet metal plate, whereas the flywheel of the internal combustion engine provided with the usual teeth 19 for engagement with a starter pinion is formed by a separate disk inserted between flange 15 and disk 16 and held in position by the bolts 16'.

The driven member 21 of the hydrodynamic clutch is fixed on a hub member 23 seated on a hollow shaft 24 and splined therewith for common rotation. A friction clutch is provided for the purpose of positively connecting the driving member 17 of the hydrodynamic clutch with the outgoing shaft of the transmission referred to hereinafter. For this purpose, a sleeve 20 is splined on the left end of an axial shaft 41 which is disposed within the hollow shaft 24, and is rigidly connected with the outgoing driven shaft 37 (Fig. 2) of the transmission. The sleeve 20 is integral with a circular disk 128 on which a pair of washers 100 and 101 of friction material are placed. Such washers serve the purpose of frictionally connecting the disk 128 and the flange of a substantially cylindrical drum 27 for common rotation in a manner to be described later.

The drum 27 is positioned inside of the driving member 17 of the hydrodynamic clutch and is splined on its outside for engagement with internal teeth of alternate disks of a stack of friction disks. The other disks of that stack have external teeth engaging splines 102 of a flanged member 28 which is inserted in and bolted to the driving member 17 of the hydrodynamic clutch. It will be noted that the inner periphery of member 17 is substantially cylindrical and engages over the drum-shaped splined portion of member 28. This member is integral with a flange 29. Thus, the drum-shaped portion of member 28, the flange 29 and the drum 27 confine an annular space B which is surrounded by and communicates with the chamber A of the hydrodynamic device. In fact, the splines 102 may be separated by radial slots and may thus constitute separate arms interconnected by both the flange 29 and by the outer flange of member 28.

An annular piston 30 which is axially movable confines the annular space of the friction clutch at the right. Therefore, movement of piston 30 to the left with reference to Fig. 1 will compress the disks splined on drum 27 alternating with the disks splined on member 28 and will thus cause the driving member 17 of the hydrodynamic device to be frictionally clutched to drum 27 which, in its turn, is connected with member 20 and shaft 41 for common rotation.

The piston 30 is integral with a hub portion 103 slidably mounted on a bushing 104 which, in its turn, is seated on and fixed to the hollow shaft 24 and is held in engagement by a nut 105 with a collar 106 engaging a shoulder of the hollow shaft 24. Between the nut 105 and the bushing 104 an annular plate 107 is interposed serving as an abutment for a helical spring 34 which acts on piston 30 tending to keep the same in the clutch-disengaging position. The piston 30 has a peripheral groove accommodating a piston ring 108 which engages a cylindrical portion of hub member 23. When fluid under pressure is admitted through a duct to the space between the piston 30 and the radially extending portion of hub member 23, the piston will be forced to the left thereby engaging the friction clutch.

On the hub member 23 a rotary member 109 is journalled by means of needle rollers or bearings 35. An annular cover plate 42 is fixed to the member 109 and by bolts 43 to the peripheral flange of the driving member 17 of the hydrodynamic device. The member 109 is journalled by a ball bearing 25 in the transmission housing 11.

As shown in Fig. 2, the end of the hollow shaft 24 carries a pinion 40 meshing with a gear 47 fixed to an auxiliary shaft 44. The latter extends parallel to the hollow shaft 24 being journalled in bearings 45 and 46 disposed in transverse walls of the transmission housing 11. Two gears 49 and 50 are rotatably mounted on shaft 44 and adapted to be individually and selectively clutched thereto for common rotation therewith by multi-disk friction clutches 54 and 55. The gear 49 is in constant mesh with a gear 65 and the gear 50 is in constant mesh with a gear 66. The gears 65 and 66 are fixed to a shaft 37 which is rigidly connected with shaft 41 and constitutes the outgoing driven shaft of the transmission. A third gear 68 disposed on shaft 37 is freely rotatably mounted thereon and adapted to be clutched thereto by a clutch 71 diagrammatically shown as a toothed clutch, but preferably formed by a one-way clutch.

When all three friction clutches are disengaged the transmission is set for the lowest speed, i.e. first speed, the power being transmitted from the engine flange 15 through the hydrodynamic clutch 17, 21 to hub member 23 and from there to the hollow shaft 24, gears 40 and 47, shaft 44 and gear 67 to gear 68 and through the one-way clutch 71 to the driven shaft 37.

When clutch 55 only is engaged the power is transmitted through the elements 15, 17, 21, 23, 24, 40, 47, and 44 as described heretofore and thence via clutch 55, gears 50 and 66 to shaft 37 which will revolve at a higher speed thus overtaking gear 68.

Engagement of clutch 54 in lieu of clutch 55 results in the setting of the transmission for the third speed, the power being transmitted from engine flange 15 in the manner described through the hydrodynamic device to shaft 44 and from their via clutch 54, gear 49 and gear 65 to the driven shaft 37.

When the two friction clutches 54 and 55 are disengaged and the friction clutch in space B is engaged, the transmission is set to fourth or direct speed, the power being transmitted from the engine flange 15 through disk 16, clutch member 17, splined member 28, 102, 29, stack of disks in space B, drum 27, friction washers 100, flanged sleeve 20, shaft 41, driven shaft 37.

It is desirable that when the driving torque is transferred through the hydrodynamic device, the working chamber A be partly or entirely filled with the operating liquid and that the space B be empty, the friction clutch in space B being disengaged, as is true when the transmission is set for the first or second or third speed. When the transmission is set for the fourth speed, however, the friction clutch in space B being engaged and the hydrodynamic device being idle, it is desirable that the space B be completely filled to flood the friction clutch with oil for the dissipation of any heat that might be produced therein.

It will be noted that the annular cover plate 42 and the driving member 17 of the hydrodynamic device constitute a rotating casing. The liquid, such as oil which fills the hydrodynamic device, is supplied to the interior of such casing through a gear pump comprising an internally toothed gear 91 mounted for rotation on the transmission housing and an externally toothed gear 92 meshing with the same and mounted on the hub member 109 which is rigid with the driving member 17 of the hydrodynamic device. The gear pump feeds oil through a duct indicated in Fig. 2 by the dotted line 110. This duct is formed by a groove 111 in the shallow shaft 24 and communicates through a hole 112 provided in member 23 with the space 124 left between the driven member 21 of the hydrodynamic device and the plate 42 and hub member 109 thereof, as clearly shown in Figure 1 of the drawing. This space in turn communicates with the working chamber A through a gap 113 provided between the opposed faces of the driving member 17 and the driven member 21.

When the casing formed by the rigidly connected members 17, 42, 29 and 109 revolves about the axis of the transmission, the liquid which fills the working chamber A will be caused by the centrifugal force to adopt an internal substantially cylindrical level indicated at 114, such level having a radius $r2$ provided that the surplus fed by pump 91, 92 will be discharged from chamber A through one or more overflow openings 115 which establish a communication of chamber A with a chamber C.

The chamber C is formed by a dish-shaped cover 116 connected by bolts 117 to the side face of driving member 17 and provided with a cup-shaped portion 118 which engages an internal bore of the crank shaft being centered therein. The cup-shaped member 118 encloses a ball bearing 119 in which the front end of shaft 41 is journalled.

For the purpose of controlling the radius of the level 114 I have provided a rotary scooping member which will withdraw the liquid discharged from the openings 115 into space C and will return such liquid through the axial bore 120 of shaft 41 into the sump provided at the bottom of the transmission casing from which pump 91, 92 is supplied with liquid.

The rotary scooping member is formed by the flanged member 20 and the disk 128 which for the purpose of withdrawing the liquid from chamber C is provided with one or more substantially radial ducts 121 extending from an axial bore 120 of shaft 41, i.e. from a point near the axis of rotation, to a point spaced from the axis of rotation by the distance R located close to the periphery of chamber C. If required, the openings 115 may be screened towards the periphery of the scooping member 20, 128 by a partition, such as 115' diagrammatically indicated in Fig. 2.

Preferably, the driving member 17 is formed with vanes 122 on its outside in the neighborhood of the openings 115 so as to cause the liquid entering the chamber C to revolve in unison with the driving member 17 and the cover plate 116 bolted thereto. For the same reason such cover plate is provided with vanes 123. As a result, the liquid in chamber C is subjected to the full pressure set up by the centrifugal force resulting from the rotation of the engine. Whenever the driven shaft 37, the shaft 31 connected therewith and the scooping member 20, 128 fixed thereto rotate at a much lower speed as in first or second speed, such pressure will cause the liquid to enter the duct 121 and to flow radially inwards therein and into the bore 120 to return to the sump.

When the shafts 37 and 41 and the scooping member 20, however, rotate at the same speed as the engine, as is true with the setting of the transmission for the fourth or direct speed, the same centrifugal force will act within the radial ducts 121 as it does outside thereof within the chamber C and, as a result, there will be no pressure differential that would cause the liquid to flow inwardly within the duct or ducts 121. Therefore, in such event the continued supply of liquid from pump 91, 92 through the space 124 will cause the volume of the liquid which fills the working chamber to be increased thereby reducing the radius of level 114 until the liquid enters the space B flooding the multi-disk clutch provided therein. When space B has been fully flooded the surplus of the liquid is caused by the pressure produced by pump 91, 92 to escape through duct 121 and bore 120.

Preferably, a smooth oil-repelling coating, such as a chromium plating or a coat of special lacquer, is provided on the disk 128 in order to reduce the friction between the same and the liquid filling the chamber C.

The connection of the scooping member 20, 128 with the drum 27 will now be described in detail. The plane circular disk 128 having a plurality of, e.g. four, radial ducts 121 is positioned between the outer flange of drum 27 and a disk 126 which are connected by spacing bolts 130 riveted thereto (Fig. 9), the washers 100 and 101 of friction material being interposed therebetween. Means are provided to firmly press the two washers upon the disk 128. To this end, a plurality of circumferentially distributed bolts 131 extend parallel to the axis of the transmission through the washers 100 and 101 and through a metal washer 127 imposed on washer 101 and carry helical springs 132 producing the required pressure. The bolts 131 and the spacing bolts 130 have ample play within holes 133 and 134 provided in the disk 128 thus permitting of a limited relative oscillation of the drum 27 and the scooping member 20, 128, such rotation being counteracted by the friction produced by the washers 100 and 101. In order to resiliently restore the parts 20 and 27 to the normal relative angular position, a plurality of circumferentially distributed pockets 135 are cut into the disk 128, the flange of drum 27 and the disk 126. Each of such pockets accommodates a helical spring 125 which will be compressed by the described relative oscillation. It is to be understood, of course, that such pockets are disposed between the four ducts 121. In this way, the two elements 20 and 27 constitute a vibration absorber which tends to absorb any rotary oscillations set up in shaft 41.

In Fig. 2 I have illustrated the hydrodynamic clutch and the associated friction clutch in a diagrammatic manner. Preferably, the axial bore 120 communicates with radial bores 129 provided in the gear 65 and opening at the periphery thereof. In such a manner the centrifugal pumping effect produced in the radial bores 129 will promote the flow of oil out of chamber C through the radial ducts 121.

From the foregoing description it will appear that the scooping member 20, 128 will always rotate in unison with the outgoing driven shaft of the transmission. Therefore, the relative speed of the scooping member 20, 128 and the driving member 17 of the hydrodynamic device differs for different speed settings of the transmission. As a result, the effectiveness of the scooping member will differ for the different speed ratios.

Where $n1$ is the speed of the driving engine member 15, $n2$ the speed of the driven outgoing shaft 37 and of the scooping member 20, 128, $i$ the speed ratio of transmission $n2/n1$, and R the radial distance of the mouth of duct 121 from the axis of the transmission, it will be found that the radius $r$ of the liquid level 114 will amount to (a) $$r = R \cdot \sqrt{1 - i^2}$$

provided that no dynamic pressure will be built up in the mouths of the ducts 121, and that (b) $$r = R \cdot \sqrt{2 \cdot (1 - i)}$$

provided that the mouths of the ducts 21 be so shaped as to produce a dynamic pressure. That is shown in Fig. 7 in which the scooping member 20 is provided with two diametrically opposed ducts 121 which are so bent that their mouths 121' face in the direction of rotation indicated by the arrow $x$.

In Fig. 6 the two ducts 121 of the scooping member 20 are shown as being so shaped as to produce no dynamic pressure. This is the shape of the ducts illustrated in Figs. 1, 2 and 8.

In computing the dynamic pressure, the resistance to flow and the viscosity of the liquid must be taken into consideration. Under practical conditions of operation, the value of $r$ will be a figure larger than that obtained by Formula $a$ and smaller than that obtained by Formula $b$.

It follows from the above equations that the radius of the liquid level 114 will be the larger the lower the speed ratio is to which the transmission has been set. Since the level is further determined by the position of the overflow openings 115, it follows that in the example illustrated in Fig. 1 the level will have the radius $r2$ for the first speed and the second speed and the radius $r3$ for the third speed. This radius $r3$ has been so chosen that the working chamber A of the hydrodynamic clutch is filled completely, while the space B accommodating the friction clutch is free from oil. When the transmission has been set to fourth or direct speed the radius $r$ is so reduced that the space B is flooded with oil, the friction clutch disposed therein being in engaged condition. Since the first speed and the second speed of an automobile transmission are used for comparatively limited periods of time only, there is no harm in keeping chamber A filled in part only for such speeds. Such partial filling indicated in Fig. 1 by the radius $r2$ involves the advantage that the hydrodynamic clutch acts in a smoother manner and permits the engine in the starting operation to reach a higher number of revolutions and thus produce a more powerful driving torque. At the same time, the undesirable creeping torque, i.e. the torque transmitted to the wheels through the hydrodynamic clutch when the vehicle is at a full stop and the engine is idling, is effectively reduced.

During the operation of the vehicle under normal conditions the third speed and the fourth speed only are used. When the transmission is set to those speeds, the chamber A is completely filled thus ensuring the highest possible efficiency and minimum losses of energy. When the transmission is set to third speed, the disengaged friction clutch in space B will not be flooded and will thus cause a minimum of fluid friction.

If desired, the dimensions of the transmission may be so selected that when the latter has been set to the second speed ratio the working chamber A is completely filled. That may be done, for instance, where it is desirable to increase the "stiffness" by increasing the outer diameter of the hydrodynamic clutch.

When the vehicle is at a full stop, the scooping member being at rest, the ratio of transmission has no influence on the scooping operation. In all speeds the scooping operation will increase the radius of level 114 up to the outer radius of the scooping member 20, 128 or to the radius $r2$ of the overflow opening 115. By the described arrangement, however, it is ensured that even before the driven member 21 of the hydrodynamic clutch starts to slip relative to the driving member 17, the working chamber A will be partly emptied at least. This contributes to a rapid reduction of the creeping torque when the engine is idling.

It is important for the effectiveness of the arrangement described that the resistance to flow in the radial ducts 121 be reduced to a minimum, since the pressure required to overcome such resistance can be derived from a reduction of the emptied space only.

Provided that a constant pressure prevails in the feed conduit 111, 112 and 124 of the hydrodynamic clutch during the operation thereof, it is possible by properly dimensioning such feed conduit to ensure the maintenance of the desired radius of the liquid level 114 within the entire range of operation. In so dimensioning the feed conduit particular consideration should be given to the fact that with high temperatures the viscosity of the oil fed into chamber A is higher than that of the oil discharged therefrom, and that such reduction of the viscosity results in both an increase of the quantity of oil fed through the supply conduit and an increase of the quantity of oil discharged through the scooping ducts 121 with a constant pressure.

In the embodiment shown, the scooping member 20, 128 is disposed within the casing formed by the cover 116, the driving member 17 and the cover plate 42. This has the advantage that the slippage in the hydrodynamic clutch will increase the relative speed of such casing and of the scooping member and will thus increase the consequent scooping effect. Also, the use of the scooping member 20, 128 as a vibration absorber adapted to absorb the torsional vibrations of shaft 41 offers the advantage of a very compact structure, since the same elements serve both functions, that of absorbing the oscillations and that of removing the surplus liquid.

Such elements as have been explained in detail with reference to Fig. 1 have been shown in Fig. 2 in a more or less diagrammatic fashion using simple symbols to represent the hydrodynamic clutch and the multi-disk friction clutches.

The same or similar symbols have been used in Figs. 3, 4 and 5 to show a number of modifications. In the transmission diagrammatically illustrated in Fig. 3 the hydrodynamic clutch 13 transmits power to an epicyclic gearing 150 comprising a sun gear 151, a carrier 154 of epicyclic gears 153 and an outer internally toothed gear 152. The hollow shaft 24 connected with the driven member 21 of the hydrodynamic clutch 13 is attached to the sun gear 151, while the carrier 154 of the epicyclic gears is fixed to the driven shaft 37 rigid with the shaft 41. The outer gear 152 cooperates with a brake and may be held stationary thereby. In this embodiment, the epicyclic gear carrier 154 is provided with radial bores 155 communicating with the bore 120 of shaft 41 and thus serves the purpose of returning the oil or other liquid from the hydrodynamic device to the sump of the transmission. The centrifugal effect upon the oil in the duct 128 will thus be balanced by the centrifugal effect acting on the oil in the bore 155. Hence, such centrifugal effect will not prevent the oil from flowing in radially inward direction through duct or ducts 128. In other words, the efficiency of the scooping duct 128 returning the oil to the sump will be increased by the length of the bores 155 on the principle of communicating tubes. The use of the carrier of the epicyclic gears for that purpose will eliminate the necessity of providing an additional element for the return line. If desired, however, radial tubes may be specially provided outside of the carrier 154.

In the embodiment illustrated in Fig. 4, the hydrodynamic clutch 13 supplies power from its driven member 21 through the hollow shaft 24 to a continuously variable transmission, such as a friction transmission. This transmission comprises a driving wheel 162 fixed to shaft 24 and provided with a side face having a convex profile, a stationary member 163 similar to the driving wheel 162, and friction rollers 161 rotatably mounted on a rotary carrier 164 for rotation about transverse axes. Since such transmissions are well known in the art a detailed description thereof is deemed dispensable herewith. It is deemed sufficient to mention that the members 162 and 163 are bodies of revolution coaxial to the main axis of the transmission coinciding with the shafts 37 and 41, and that the axis of rotation of each roller may be angularly adjusted to thereby determine the ratio of transmission. In this embodiment, the carrier 164 of the friction rollers 161 is provided with radial bores 165 which communicate with the bore 120 and the scooping ducts 121 thus relieving the latter from the effect of the centrifugal force.

Moreover, in the embodiments of Figs. 3 and 4, the scooping member 128 also serves the purpose of transmitting the torque from the friction clutch in space B to the driven train of shafts 41, 37.

In the embodiment shown in Fig. 5, the scooping member 20, 128 is formed by the friction disk of a single-disc-friction clutch 170 adapted to clutch the engine shaft 15 to the inner shaft 41. In this embodiment the hydrodynamic device 13 is a torque convertor 171 rather than a clutch, such convertor comprising a pump wheel or primary member 172 connected to the engine shaft 15 and a turbine wheel or secondary member 173 fixed to the hollow shaft 24 and a guide wheel 174. The shaft 24 acts on a suitable gearing, such as an epicyclic gearing 150 of the kind described with reference to Fig. 3. The guide wheel 174 provided with suitable vanes is braced against the stationary housing of the transmission by a one-way clutch 175 in a known manner. Also, in this embodiment the carrier 154 of the epicyclic gears is provided with a radial discharge bore 155 communicating with and adapted to relieve the scooping ducts 121.

In any one of the above described embodiments the mouths of the scooping ducts 121 may be radially directed as shown in Fig. 6, or may be inclined with reference to the direction of rotation indicated by the arrow $x$ facing in a forward direction as shown in Fig. 7. In the latter event the angle of inclination between the mouth of the scooping duct and the arrow $x$ may amount to any desired degree up to 90°. As a result, a dynamic pressure will be produced in such mouth by the liquid dammed up in front thereof. This dynamic pressure is utilized to feed the liquid through the scooping duct and the bore 120. The damming effect may be increased by the provision on the scooping member of suitable projections adjacent to the mouths of the scooping ducts. The scooping member itself, whether formed by a circular disk, such as disk 128 shown in Fig. 1, or by a tube as shown in Figs. 6 and 7, should be so shaped and finished as to have a minimum of friction in the oil. To that end, the cross section of the tubes shown in Figs. 6 and 7 may be streamlined and the surface of such tubes may be chromium-plated or otherwise coated with a substance having a repelling effect on oil. If desired, valves may be provided so controlling the supply of the oil by pump 91, 92 as to throttle or cut off such supply to the hydrodynamic device whenever the friction clutch in space B is engaged. Similarly, spring-controlled throttle valves may be provided in the return line composed of the ducts 121 and 120 for the purpose of building up a super-pressure within the clutch without influencing the scooping function itself.

The essence of my invention will now be briefly recapitulated. From the above it will be understood that I have provided means for so controlling the liquid level in the rotating hydrodynamic clutch that the latter my be kept filled while the friction clutch in space B surrounded by the working chamber A of the hydrodynamic clutch is free from liquid. This control of the liquid level is effected by the scooping member 20, 128 which radially extends beyond the outer periphery of the friction clutch in space B.

In so controlling the liquid level I obtain a reduction of the idling losses of the friction clutch in space B to a minimum since such idling losses are considerably higher when the friction disks are rotating in oil than they are when the friction disks are rotating in air, particularly where the clutch is of the multidisk type.

Since it has been found useful to keep the friction clutch well lubricated, I have so devised the scooping member which is operative to scoop the liquid out of the chambers A and B of the clutches that the relative rotary speed of such scooping member depends on the ratio of transmission of the speed change gearing arranged to be driven by the hydrodynamic clutch. As a result, the pumping effect depending on the differential rotary speeds of the scooping member and the driving element of the hydrodynamic device will cause the liquid level 114 to be adjusted to a smaller diameter for a higher speed ratio and to a larger diameter for a lower speed ratio. Since the friction clutch disposed inside of the hydrodynamic clutch serves the purpose of mechanically bypassing the hydrodynamic device for the direct speed ratio, I thus ensure an evacuation of the space B accommodating such friction clutch from liquid whenever the transmission is set to lower speed ratios the friction clutch being disengaged, whereas the friction clutch will be filled with oil when the transmission is set to the highest or direct speed ratio in which the clutch is engaged to bypass the hydrodynamic device.

Preferably, the scooping member is mounted on the inner end of the outgoing driven shaft 37, 41 of the transmission extended towards the engine to project into the space C provided between the engine and the hydrodynamic device. The wall of the working chamber A of the hydrodynamic device is preferably provided with overflow openings, such as 115, determining the maximum discharge during the operation, such openings being preferably disposed at a smaller radius than the radius of the mouths 121' of the scooping member. The scooping ducts 121 are preferably provided in an element serving another useful function, for instance in a vibration absorber or in a member carrying the friction clutch or the like. As a result, no additional elements which would increase the length of the transmission need be provided for the accommodation of the scooping ducts. The mouths of the latter may be disposed tangentially or radially. Where they are disposed in the manner shown in Fig. 7, a dynamic pressure will be produced by the relative rotation of the scooping element and the walls of chamber C.

In order to reduce the energy required for the scooping operation the discharge ducts are preferably so disposed as to terminate on a large diameter, such as shown in Fig. 2 where the discharge ducts 129 terminate on the periphery of gear 65, or as shown in Fig. 3 where they terminate on the periphery of the epicyclic gear carrier 154, or as shown in Fig. 4 where they terminate on the periphery of carrier 164 of the friction rollers 161.

While I have described my invention with reference to a number of preferred embodiments thereof, I wish it to be clearly understood that my invention is in no way limited to the details thereof, but is capable of numerous modifications within the scope of the appended claims.

What I claim is:

1. In a transmission of the character described, the combination comprising a casing, means for mounting said casing for rotation about an axis, a hydrodynamic device in said casing including a substantially annular working chamber coaxial to said axis, means confining an annular space surrounding by and communicating with said chamber, a friction clutch coaxially disposed within said space, means for supplying to said working chamber and to said annular space a liquid which upon rotation of said casing will be caused by the centrifugal force to adopt an internal substantially cylindrical level coaxial to said axis, and controlling means for controlling the radius of said level in said working chamber to keep said working chamber substantially filled and to keep said friction clutch free from said liquid.

2. In a transmission of the character described, the combination comprising a casing, means for mounting said casing for rotation about an axis, a hydrodynamic clutch in said casing including a substantially annular working chamber coaxial to said axis, means confining an annular space surrounded by and communicating with said chamber, a friction clutch coaxially disposed within said space, means for supplying to said working chamber and to said annular space a liquid which upon rotation of said casing will be caused by the centrifugal force to adopt an internal substantially cylindrical level coaxial to said axis, and controlling means for controlling the radius of said level in said working chamber to keep said radius at least as large as the outer radius of said friction clutch.

3. The combination claimed in claim 2, in which said controlling means comprises a scooping member mounted for rotation about said axis and provided with at least one duct extending from a point near said axis to a point spaced from said axis at least the distance of said radius and adapted to carry away a surplus of said liquid.

4. In a transmission of the character described, the combination comprising a casing, means for mounting said casing for rotation about an axis, a hydrodynamic clutch in said casing including a substantially annular working chamber coaxial to said axis, means confining an annular space surrounded by and communicating with said chamber, a friction clutch coaxially disposed within said space, means for supplying to said working chamber and to said annular space a liquid which upon rotation of said casing will be caused by the centrifugal force to adopt an internal substantially cylindrical level coaxial to said axis, means for engaging and disengaging said friction clutch, and controlling means governed by said last-mentioned means to so control the radius of said level that the said level will exceed the outer radius of said friction clutch during disengagement of said clutch and that said radius will be smaller than the outer radius of said friction clutch to flood the latter upon engagement of said friction clutch.

5. In a transmission of the character described, the combination comprising a casing, means for mounting said casing for rotation about an axis, a hydrodynamic clutch in said casing including a driving member and a driven member cooperating to form a substantially annular working chamber coaxial to said axis, means confining an annular space surrounded by and communicating with said chamber, a friction clutch coaxially disposed within said space, means adapted to supply to said working chamber a liquid which upon rotation of said casing will be caused by the centrifugal force to adopt an internal substantially cylindrical level coaxial to said axis, means for engaging and disengaging said friction clutch, a scooping member mounted for rotation about said axis and provided with at least one duct extending from a point near said axis to a point spaced from said axis at least the distance of said radius and adapted to carry away a surplus of said liquid, said scooping member being adapted to be clutched by said friction clutch to said driving member of said hydrodynamic clutch, a plurality of sets of gears adapted when active to gear said scooping member to said driven member of said hydrodynamic clutch, and clutches adapted to optionally render said sets of gears active or inactive.

6. In an automobile transmission, the combination comprising a hydrodynamic device including a driving member and a driven member cooperating to form a substantially annular working chamber, a driven shaft, means to gear said driven shaft to said driven member of said hydrodynamic device, a rotary scooping member fixed to said driven shaft and provided with at least one duct extending from a point near its axis to a point remote from its axis and adapted to communicate with said working chamber to conduct liquid therefrom.

7. The combination claimed in claim 3 in which said casing is provided with a chamber outside of but communicating with said working chamber and accommodating said scooping member.

8. The combination claimed in claim 7 in which the communication between said chamber and said working chamber is constituted by an opening provided in said driving member of said hydrodynamic device at a radial distance from said axis exceeding the outer radius of said friction clutch.

9. The combination claimed in claim 7 in which the communication between said chamber and said working chamber is constituted by an opening provided in said driving member between the outer end of said duct of said scooping member and the periphery of said space accommodating said friction clutch.

10. In a transmission of the character described, the combination comprising a hydrodynamic device including a driving member and a driven member cooperating to form a substantially annular working chamber and mounted for rotation about an axis, means confining an annular space surrounded by and communicating with said chamber, a friction clutch coaxially disposed within said space, means for supplying a liquid to said working chamber along the outer periphery thereof, a wall member mounted on said driving member and confining therewith a second chamber adjacent to said working chamber and said space, a rotary scooping member disposed within said second chamber and provided with a duct adapted to receive fluid near the periphery of said second chamber and to conduct the same away, therefrom, said driving member being provided with an opening establishing a communication between said working chamber and said second chamber located on a smaller radial distance than said outer periphery, and vanes provided on said driving member in the neighborhood of said opening between the latter and said scooping member, the open end of said duct being located on a radial distance intermediate said smaller radial distance and said outer periphery.

11. In an automobile transmission, the combination comprising a driving element, an intermediary shaft, a hydrodynamic device for transmission of power from said driving element to said intermediary shaft, an outgoing shaft provided with a discharge conduit, said hydrodynamic device being formed by a driving member and a driven member enclosing an annular working chamber, all of the afore-stated elements being coaxially disposed, a gearing to transmit power from said intermediary shaft to said outgoing shaft, means to enable or disable said gearing to so transmit power, means to supply a liquid to said annular working chamber, a rotary scooping member fixed to said outgoing shaft and communicating with said working chamber and with said discharge conduit and adapted to scoop up and discharge liquid from said working chamber, and a disengageable friction clutch adapted to connect said scooping member to said driving member of said hydrodynamic device.

12. In an automobile transmission, the combination comprising a driving element, an intermediary shaft, a hydrodynamic device for transmission of power from said driving element to said intermediary shaft, an outgoing shaft provided with a discharge conduit, all of said afore-stated elements being coaxially disposed, a plurality of sets of gears each adapted to transmit power from said intermediary shaft to said outgoing shaft, a plurality of clutches individually coordinated to said sets of gears and adapted to render said gears operative to transmit power, said hydrodynamic device being formed by a driving member and a driven member enclosing an annular working chamber, means to supply a liquid to said annular working chamber, a rotary scooping member fixed to said outgoing shaft and communicating with said working chamber and with said discharge conduit and adapted to scoop up and discharge liquid from said working chamber, a friction clutch adapted to connect said scooping member to said driving member of said hydrodynamic device, and means for engaging and disengaging said friction clutch.

13. The combination claimed in claim 11 comprising in addition means confining a space surrounded by said working chamber and communicating therewith, said friction clutch being a clutch of the multi-disk type disposed within said space.

14. The combination claimed in claim 12 in which said sets of gears include a gear fixed to said outgoing shaft and provided with at least one radial discharge duct communicating with said discharge conduit.

15. The combination claimed in claim 11 in which said scooping member forms an element of said friction clutch.

16. The combination claimed in claim 11 in which said scooping member is provided with peripheral inlets having radial axes.

17. The combination claimed in claim 11 in which said scooping member is provided with peripheral inlets having non-radial axes and facing in the direction of rotation of said scooping member.

18. The combination claimed in claim 11 in which said scooping member is provided with an oil-repelling coating.

19. The combination according to claim 3, further comprising output means, and wherein said controlling means comprises one part including said scooping member and said duct and another part movable relatively to said first-mentioned part, and means including spring means for frictionally coupling said first part with said second part, said first-mentioned part being connected with said output means and constituting a vibration absorber together with said second-mentioned part.

20. In a transmission the combination of input means, output means, a hydrodynamic device provided with a working chamber and having driving means and driven means, means connecting said driving means with said input means, means connecting said driven means with said output means to drive said output means at a lower rotational speed than said input means due at least to slippage in said hydrodynamic device and to thereby provide relative rotational speed between said input and output means, means for supplying a hydraulic medium to said working chamber and for withdrawing the hydraulic medium from said working chamber, including fluid level adjusting means in said last-named means operatively connected with said output means so as to rotate at a speed of said output means for automatically controlling the level of said hydraulic medium in said working chamber in dependence on said relative speed between said driving means and said fluid level adjusting means.

21. In a transmission the combination of input means, output means, a hydrodynamic device provided with a working chamber and having driving means and driven means, means connecting said driving means with said input means, means connecting said driven means with said output means to drive said output means at a lower rotational speed than said input means due at least to slippage in said hydrodynamic device and to thereby provide relative rotational speed between said input and output means, means for supplying a hydraulic medium to said working chamber and for withdrawing the hydraulic medium from said working chamber, including fluid level adjusting means in said last-named means operatively connected with said output means so as to rotate at the speed of said output means and operative as a result of the centrifugal forces acting on said hydraulic medium for automatically controlling the level of said hydraulic medium in said working chamber in dependence on said relative speed between said driving means and said driven means.

22. In a transmission the combination of input means, output means, a hydrodynamic device provided with a working chamber and including driving means and driven means, means for connecting said driving means with said input means, means for connecting said driven means with said output means to drive said output means at a lower rotational speed than said input means due to slippage in said hydrodynamic device to thereby provide relative rotational speed between said input and output means, means providing a space in direct fluid communication with said working chamber and including means for connecting said input means directly with said output means, means for supplying a hydraulic medium to said working chamber and to said space and for withdrawing said hydraulic medium from said working chamber, and means in said last-named means connected to one of said driven means and output means for simultaneously controlling the amount of hydraulic medium in said working chamber and in said space in dependence on said relative speed between said input means and said output means.

23. In a transmission the combination of input means, output means, a hydrodynamic device provided with a working chamber and including driving means and driven means, means for connecting said driving means with said input means, means for connecting said driven means with said output means to drive said output means at a lower rotational speed than said input means due to slippage in said hydrodynamic device to thereby provide relative rotational speed between said input and output means, means providing a space in direct fluid communication with said working chamber and including coupling means for connecting said input means directly with said output means to thereby eliminate any relative speed between said input and output means due to slippage in said hydrodynamic device, means for supplying a hydraulic medium to said working chamber and to said space and for withdrawing said hydraulic medium from said working chamber, and means in said last-named means for simultaneously controlling the amount of hydraulic medium in said working chamber and therewith in said space in dependence on the relative speed between said input means and said output means to provide hydraulic medium in said space only upon actuation of said coupling means.

24. In a transmission the combination of input means, output means, a hydrodynamic device provided with a working chamber and including driving means and driven means, means for connecting said driving means with said input means, means for connecting said driven means with said output means to drive said output means at a lower rotational speed than said input means due to slippage in said hydrodynamic device to thereby provide relative rotational speed between said input and output means, means providing a space in direct fluid communication with said working chamber and including means for connecting said input means directly with said output means to thereby eliminate any relative speed between said input and output means due to slippage in said hydrodynamic device, means for supplying a hydraulic medium to said working chamber and to said space and for withdrawing said hydraulic medium from said working chamber, and means in said last-named means for simultaneously controlling the amount of hydraulic medium in said working chamber and in said space in dependence on the relative speed between said input means and said output means to provide a minimum amount of hydraulic medium in said working chamber during maximum slippage between said driving means and said driven means and to provide a hydraulic medium in said space only with less than a predetermined slippage between said driving means and said driven means.

References Cited in the file of this patent
UNITED STATES PATENTS

| | | |
|---|---|---|
| 1,859,607 | Sinclair | May 24, 1932 |
| 2,588,220 | Duffield | Mar. 4, 1952 |
| 2,591,342 | Dodge | Apr. 1, 1952 |
| 2,627,166 | Becker | Feb. 3, 1953 |
| 2,644,304 | Becker | July 7, 1953 |